United States Patent [19]

Oyama et al.

[11] 3,717,559

[45] Feb. 20, 1973

[54] PROCESS FOR THE PREPARATION OF POLYPROPYLENE RESIN FOAMS

[75] Inventors: Minoru Oyama; Masaaki Yamada; Shunji Ohkubo; Atsushi Osakada, all of Ohtsu-shi, Japan

[73] Assignee: Toray Industries, Inc., Tokyo, Japan

[22] Filed: May 31, 1968

[21] Appl. No.: 733,584

[30] Foreign Application Priority Data

| Feb. 18, 1967 | Japan | 42/10159 |
| May 31, 1967 | Japan | 42/34234 |
| Aug. 22, 1967 | Japan | 42/53454 |
| Sept. 21, 1967 | Japan | 42/60165 |

[52] U.S. Cl.........204/159.17, 260/2.5 HA, 260/878, 260/885
[51] Int. Cl.........C08f 27/00, C08f 47/10, C08f 1/16
[58] Field of Search.................204/159.17; 260/2.5 E

[56] References Cited

UNITED STATES PATENTS

| 3,294,869 | 12/1966 | Robinson | 205/159.17 |
| 3,413,244 | 11/1968 | Landler et al. | 260/2.5 |
| 2,948,664 | 8/1960 | Rubens et al. | 260/2.5 |
| 3,098,832 | 7/1963 | Pooley et al. | 260/2.5 E |
| 3,542,702 | 11/1970 | Okada et al. | 260/2.5 HA |

*Primary Examiner*—Samuel H. Blech
*Assistant Examiner*—Wilbert J. Briggs, Sr.
*Attorney*—Sughrue, Rothwell, Mion, Zinn & Macpeak

[57] ABSTRACT

A process for the preparation of a polypropylene resin foam having closed cells by irradiating high energy rays onto a mixture of a polypropylene resin, a foaming agent, and a cross-linking promotor to cause cross-linking of the polypropylene resin and thereafter heating the mixture to a temperature higher than the decomposition temperature of the foaming agent.

12 Claims, 2 Drawing Figures

PROCESS FOR THE PREPARATION OF POLYPROPYLENE RESIN FOAMS

BACKGROUND OF THE INVENTION

A polypropylene resin foam is a hard polyolefin foam and has a high heat resistance and a high mechanical strength as compared with a polyethylene foam, a typical polyolefin foam.

Commercially available polypropylene resin has a high crystalline property. Moreover, its melt viscosity is suddenly lowered when the resin is heated to a temperature higher than the melting point thereof. Hence, it is difficult for the resin to retain therein sufficiently the gas formed from the foaming agent. Accordingly, in order to obtain a foam of a polypropylene resin, it is necessary that the resin be subjected to a suitable cross-linking reaction to provide a suitable viscosity for foaming of the melt of the resin. In conventional processes for producing polypropylene foams, such cross-linking means have been adopted. However, since in the conventional processes of cross-linking a polypropylene resin by a chemical cross-linking method in which an azide compound or an organic peroxide is employed as the cross-linking agent, the decomposition temperature of the cross-linking agent is close to the melting point of a polypropylene resin, the cross-linking agent tends to be decomposed when a mixture of the polypropylene resin, the cross-linking agent and a foaming agent is melted or molded. Thus, the cross linkage in the foam obtained and the distribution of cells is inferior; the foam becomes unbalanced in mechanical strength. In particular, uneven patterns caused by the cross linkage formed during melting and mixing appear on the sliced surface of the foam, which deleteriously affects the appearance and moldability of the foam. Moreover, in a conventional process for producing a polypropylene foam by such chemical cross-linking methods, the cross linkage usually occurs almost simultaneously with the foaming due to the proximity between the softening point of the resin, and the decomposition points of the chemical cross-linking agent and the foaming agent. Consequently, when the foaming procedure is conducted under normal pressure, the degree of cross-linking tends to become insufficient; the resin cannot retain sufficiently the foams of the gas produced, and therefore, it is difficult to obtain an excellent foam. Therefore, the foaming procedure is usually conducted under pressure. In such high pressure operations, however, a continuous foamed body cannot be obtained.

Furthermore, there has been employed a cross-linking method utilizing irradiation of high energy radiations. However, in such methods, several ten megarad. of radiation are necessary and hence the polypropylene is violently degraded by the irradiation. Hence, a good foam is not obtainable by the method. Further, it is known to prepare block-shaped foams by a press foaming method and a sheet-shaped foam by an extrusion foaming method. However, since the former is produced by a batch method, a long continuous foam cannot be prepared, which affects the efficiency of the method. Also, in the case of preparing a sheet-shaped foam by the extrusion method, the azide cross-linking agent is decomposed in the extruder to cause a local cross linkage of the resin and hence a foam having a high foaming percentage and uniform cells cannot be obtained. In general, when a foam having a high foaming percentage is prepared by such an extrusion foaming method, breakage and shrinkage of cells occurs and therefore only a foam having very coarse cells of 700–1,000 microns in diameter, such as, a high foaming percentage polyethylene foam Etha foam (The Dow Chemical Co.) can be obtained. The same is true as to polypropylene foams. For reference, FIG. 1 shows a photograph of the sliced surface of a polypropylene resin foam prepared by a conventional press foaming method using an azide-type cross-linking agent. From the result, it is clear that the uniformity of cells is low as compared with the sliced surface of the polypropylene foam of this invention (FIG. 2) and uneven patterns caused by cross linkage are observed.

Accordingly, the only kind of polypropylene foams which are cross linked and have fine cells are the block-shaped foam as mentioned above. However, by this process, continuous sheet-shaped polypropylene foams cannot be formed.

SUMMARY OF THE INVENTION

We have overcome these difficulties in the aforesaid conventional process and have developed an improved process for preparing propylene foams. We have found that an excellent polypropylene foam having fine closed cells therein can be prepared by incorporating a cross-linking promotor in a mixture of a polypropylene resin and a foaming agent, irradiating the mixture with high energy radiations to cause proper cross linkage, and thereafter heating the mixture to a temperature higher than the decomposition point of the foaming agent.

One of the features of the present invention is that a continuous sheet-shaped polypropylene foam can be prepared. Another feature of this invention is that a polypropylene foam uniformly cross-linked and having a fine cellular structure can be prepared.

Since in the process of this invention, the cross linkage of the polypropylene by high energy rays is conducted before foaming and also, as will be mentioned below, since the boiling point of the cross-linking promotor is higher than the melting point of the polypropylene resin, neither the thermal decomposition of the chemical cross-linking agent nor boiling of the cross-linking promotor occur when mixing the components for the foaming resin composition such as is encountered in a conventional chemical foaming method. Also, the polypropylene resin can be mixed with the cross-linking promotor and the foaming agent by means of an extruder or a mixing roll in a molten state of the resin, which makes it possible to disperse or mix uniformly the foaming agent and the cross-linking promotor in the resin and to provide a polypropylene foam having uniform cellular structure and a uniform cross-linked structure. Moreover, for the same reasons, the premold of the resin can be melt-molded and a polypropylene resin sheet containing a foaming agent necessary for preparing a continuous sheet-shaped foam can be molded by means of an extruder or a calendar roll. Furthermore, by the process of this invention, a continuous sheet-shaped polypropylene foam can be prepared by continuously irradiating the resin thus molded by means of an electron accelerator and thereafter heating the resin to a temperature higher than the decomposition point of said foaming agent. The aforesaid continuous foam sheet method shows a high degree of efficiency as compared with a conventional batch type foaming method such as a press foaming and hence is an industrially profitable process.

DETAILED DESCRIPTION OF THE INVENTION

Figure 1:
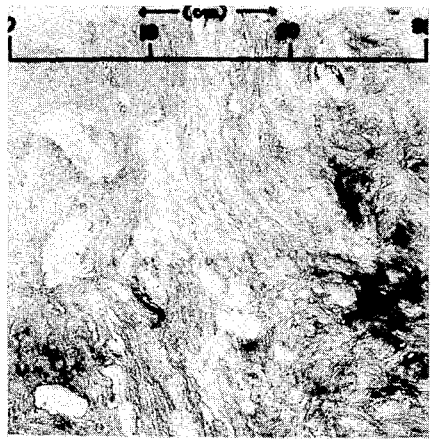

The polypropylene resin used in the process of this invention is a stereospecific polymer polymerized by using a Ziegler type catalyst, a block copolymer of graft copolymer of a crystalline polypropylene containing more than 50 percent by weight propylene, and a mixture of organic high molecular weight materials containing more than 50 percent by weight stereospecific polypropylene. The crystalline polypropylene copolymers are copolymers of propylene and a monomer having a

group and containing more than 50 percent by weight propylene, such as a propylene-divinylbenzene copolymer, a propyleneethylene copolymer and the like. Further, as organic high molecular materials to be employed as the components of the aforesaid mixtures with stereospecific polypropylene, there may be mentioned polyolefins other than polypropylene, a copolymer of an $\alpha$-olefin and a vinyl ester, a copolymer of $\alpha$-olefin and $\alpha, \beta$-unsaturated carboxylic acid, a copolymer of $\alpha$-olefin and $\alpha, \beta$-unsaturated carboxylic ester, a chlorinated $\alpha$-olefin, a synthetic rubber, and the like. Suitable examples of such organic high molecular materials are polyethylene, a copolymer of ethylene and vinyl acetate, a copolymer of ethylene and acrylic acid, a copolymer of ethylene and ethyl acrylate, polybutadiene, polyisoprene, a butyl rubber, an ethylene-propylene rubber, a butadienestyrene rubber, chlorinated polypropylene, chlorinated polyethylene, etc. In particular, a material having a double bond in the molecule, such as polybutadiene and polyisoprene among the aforesaid materials have the advantage that when the mixture containing the material is subjected to a cross-linking reaction by the irradiation of high energy radiations, the material is caused to react with a cross-linking agent contained therein to remarkably increase the cross-linking rate and also to provide elasticity to the foam obtained. Moreover, there may be added in the cross-linking system of the polypropylene resin such additives as a polymerizing monomer, a heat stabilizer, an antioxidant, an extender, a flame-resisting agent, a coloring material, an antistatic agent, a plasticizer, and the like.

The softening or melting point of the polypropylene resin depends considerably upon the composition thereof but is usually 150°–170°C., and the addition of an organic low molecular weight compound capable of dissolving therein polypropylene or a high molecular weight material having a low softening point compatible with polypropylene is effective for reducing the softening or melting point of the resin and improving the moldability thereof.

As the cross-linking promotor used in the process of this invention, there may be mentioned polyacrylates, polymethacrylates, polyvinyl ethers, and polyallyl ethers of a polyhydric alcohol of five to 20 carbon atoms and having at least one aliphatic ring or aromatic ring and the polyallyl esters, polyvinyl esters, polyacryloyloxyalkyl esters (alkyl group having one to 10 carbon atoms), and polymethacryloyloxyalkyl esters (alkyl group having one to 10 carbon atoms) of a polyhydric carboxylic acid having at least five carbon atoms in the main chains and less than 20 whole carbon atoms. As suitable examples, there may be mentioned hydroquinonemethacrylate, hydroquinonediacrylate, bisphenol A dimethacrylate, bisphenol A diacrylate, resorcindimethacrylate, resorcindiacrylate, biphenoldimethacrylate, biphenoldiacrylate, p,p'-bis(methacroyloxy) phenyl ether, p,p'-bis(methacrolyloxy)benzophenone, p,p'-bis(acryloyloxy)benzophenone, 1,4-bis(methacryloyl)naphthalene, 1,4-bis(acryloyloxy) naphthalene, 9,10-bis(methacryloyloxy)anthracene, 9,10-bis(acryloyloxy) anthracene, p,p'-bis(methacryloyloxymethyl)-benzene, p,p'-bis(acryloyloxymethyl)benzene, 1,4-bis(methacryloyloxy)cyclohexane, 1,4-bis (acryloyloxy)cyclohexane, 1,3-bis-(methacryloyloxy)cyclohexane, 1,3-bis(acryloyloxy)cyclohexane, hydroquinonedivinyl ether, bisphenol A divinyl ether, hydroquinonediallyl ether, bisphenol A allyl ether, resorcindivinyl ether, resorcindiallyl ether, biphenol divinyl ether, biphenol diallyl ether, p,p'-bis(vinyloxy)phenyl ether, p,p'-bis(allyloxy)phenyl ether. 1,4-bis(allyloxy)naphthalene, 1,4-bis(vinyloxy) naphthalene, 1,4-bis(vinyloxy)cyclohexane, 1,4-bis(allyloxy)cyclohexane, diallyl phthalate, divinyl phthalate, diallyl isophthalate, divinyl isophthalate, divinyl terephthalate, diallyl terephthalate, diallyl sebacate, diallyl adipate, divinyl adipate, divinyl sebacate, butenetricaboxylic acid triallyl ester, butenetricarboxylic acid diallyl ester, bis($\beta$-acryloyloxyethyl)terephthalate, bis($\beta$-methacryloyloxyethyl)phthalate, bis($\beta$-methacryloyloxyethyl)sebacate, bis($\beta$-acryloyloxyethyl)adipate, bis($\beta$-acryloyloxyethyl)sebacate, bis($\beta$-methacryloyloxyethyl)adipate, p,p'-bis(methacryloyloxy)diphenyl ethane, p,p'-bis(acryloyloxy) diphenyl ethane, p,p'-bis(methacryloyloxy)phenyl sulfide, p,p'-bis(acryloyloxy)phenyl sulfide, p,p'-bis(methacryloyloxy)phenyl sulfone, p,p'-bis(3-methacryloyloxypropyl)terephthalate, p,p'-bis(3-acryloyloxypropyl)terephthalate, p,p'-bis(3-methacryloyloxypropyl)phthalate, triallyl trimellitate, tera-allyl pyromellitate, bis($\beta$-methacryloyloxyethyl)terephthalate, bis($\beta$-acryloyloxyethyl)phthalate, and the like.

The aforesaid cross-linking promotors are high boiling compounds having low melting points. They are also in a crystal state under normal temperature or having boiling points under normal pressure higher than the melting and molding temperatures of polypropylene. Accordingly, the cross-linking promotors may be mixed with polypropylene by means of a simple industrial mixing apparatus such as an extruder or a kneading roll. Furthermore, since such cross-linking promotors can be purified easily and there is little coloring or degradation of the foam caused by impurities in the cross-linking promotor. Also, as the structure of the cross-linking portion of the promotor has not only a carbon frame such as divinylbenzene, but also an ester bond or an ether bond, the foam prepared has a high softness or flexibility. A foam having a uniform cell structure and excellent impact strength and shock absorbing property can therefore be obtained with the same cross-linking degree as compared with the case of using divinylbenzene as the cross-linking agent.

Moreover, since the cross-linking promotor used in this invention contains in the molecule an aromatic ring or an aliphatic ring as mentioned above, it has a good compatibility with polypropylene as compared with a conventional promotor having a low percentage of $CH_2$ bonds in the molecule, such as ethyleneglycol dimethacrylate or polyethyleneglycol dimethacrylate. Accordingly, migration of the cross-linking promotor from the polypropylene resin during kneading or after molding is less than in the case of employing a conventional cross-linking promotor.

Among the above-illustrated cross-linking promotors, the particularly preferable ones are the polyacrylates and polymethacrylates of a polyhydric alcohol having at least one aromatic ring and five to 20 carbon atoms and the polyacryloyloxyalkyl esters and polymethacryloyloxyalkyl esters of a polyhydric carboxylic acid having at least five carbon atoms in the main chain and less than 20 whole carbon atoms. Since these cross-linking promotors have acryloyl groups or methacryloyl groups having a large radical reactivity by high energy radiations, the cross-linking efficiency by these promotors is better than in the case of employing a conventional promotor and the cross-linking reaction can proceed sufficiently under a low dose as shown in the following table.

TABLE 1

(Comparison of polymerization rate by the irradiation of electron rays) (70°C.)

| Cross-linking agent | Dose (Mrad) | Irradiation Time (sec) | Polymerization rate |
|---|---|---|---|
| Divinylbenzene | 2 | 15 | 1.5% |
| Divinylbenzene | 6 | 45 | 5 |
| Hydroquinonediacrylate | 2 | 15 | 48 |
| Hydroquinonediacrylate | 6 | 45 | 89.5 |
| Diallyl maleate | 2 | 15 | 0.5 |
| Diallyl maleate | 6 | 45 | 3.5 |
| Triallyl phosphate | 6 | 45 | 4.5 |

The aforesaid cross-linking promotors may be used alone or as a mixture of two or more promotors. The amount of the cross-linking promotor is usually 0.1–30 percent by weight, preferably 0.3–15 percent by weight based on the weight of the polypropylene resin.

The foaming agent used in this invention is a chemical material which is in a liquid or a solid state under normal temperature and decomposed by heating to provide a gas. Any materials having substantially no deleterious effects on the cross-linking reaction may be employed. However, as the preferable foaming agent for practicing the process of this invention, there may be used a chemical foaming agent having a decomposition point higher than the softening point of the polypropylene resin to be employed.

Suitable examples of foaming agents are azodicarbone acid amide, dinitrosopentamethylene tetramine, trihydrazinotriazine, metal salt of azodicarboxylic acid, p-toluene-sulfonyl semicarbazide, p,p'-oxybis(benzenesulfonyl semicarbazide), bisbenzenesulfonyl hydrazide, phenylazo-iso-butyronitrile, and the like.

The amount of the foaming agent employed is usually 0.1–40 percent by weight based on the weight of the polypropylene resin to be employed but the amount may be varied desirably according to the type thereof.

The plasticizer employed in the present invention is an organic compound having a compatibility with the polypropylene resin and a good solvent therefor. The important advantage in employing the plasticizer is that by the addition thereof the polypropylene resin mixture can be effectively molded into sheet form at a lower temperature by means of an extruding machine.

Suitable examples of plasticizers employed in the process of this invention are divinylbenzene, ethylvinylbenzene, vinyltoluene, styrene, tetralin, diethylbenzene, ethylbenzene, xylene, toluene, tetrachloroethane, dioctylphthalate, dibutylphthalate, butylbenzylphthalate, N-vinylcarbazole, and liquid paraffins having more than 10 carbon atoms. Among them, ones having radical-polymerizable double bonds, such as divinylbenzene, ethylvinylbenzene, vinyltoluene, and styrene are effectively employed where it is desired to mold the polypropylene-containing mixture into a sheet by means of an extruder at low temperatures. The decomposition of the foaming agent does not occur without reducing the rigidity of polypropylene foam since such a plasticizer is copolymerized with the polymerizable cross-linking agent at cross linking by high energy radiation and combined to the polypropylene resin. The amount of the plasticizer employed is usually 0–40 percent by weight preferably 3–25 percent by weight to the weight of the polypropylene resin.

The polypropylene resin may be mixed with the foaming agent and the cross-linking promotor by any desired mechanical mixing process. In particular, there may be effectively employed a Henschel mixer, a Bumbury mixer, a mixing roll, an extruder, a method wherein the polypropylene resin is immersed in a solution containing the foaming agent and the cross-linking promotor, or by combinations of these techniques.

As high energy radiations used in the process of this invention, there may preferably be employed α-particles, γ-rays and β-rays from a radioactive isotope such as $^{60}Co$ and electron rays from an electron accelerator. X-rays and ultraviolet rays may also be employed. The amount of the high energy radiations depends upon the kind of the cross-linking promotor and the extent of cross linking to be desired and is usually 0.1–30 megarads, preferably 0.5–20 megarads.

The cross-linking percentage in the process of this invention is 5–90 percent preferably 20–80 percent. If the cross-linking percentage is less than 5 percent, a foam having closed cells will not be obtained while if higher than 90 percent, the foaming percentage is low due to the excess cross-linkage and undesirable voids are formed in the cells, which reduces the heat mold ability of the foam. By "cross-linking percentage" is meant in this specification the weight percent of an undissolved portion when 0.2 g. of a sample is immersed in 50 ml. of tetralin for three hours at 135°C.

As a procedure for foaming in the process of this invention there may be employed a method comprising heating the irradiated mixture of polypropylene to a temperature higher than the vaporization temperature or the decomposition point of the foaming agent or the organic inflating agent, usually to 350°C. under normal pressure or under pressure. A continuous sheet-shaped foam of polypropylene can be easily obtained when the foaming procedure is conducted at normal pressure.

As the heating means for foaming, there may be employed steam heating, infrared rays heating, a polyethylene glycol heating bath, a silicon heating bath, a nitrate heating bath, a molten salt bath of a mixture of low melting salts, a molten salt bath of a mixture of low melting salts, a molten alloy bath, a combination of a heating bath and infrared rays heating, and heating by steam, hot blast or electric heating in a closed or compressible metallic mold.

Since in the process of this invention, cross-linking by high energy radiations is employed in lieu of a conventional chemical cross-linking manner, no radical forming agent is present in the system in the step of mixing the polypropylene resin with the foaming agent and the cross-linking promotor or molding the mixed composition. Therefore, it is possible to mix the components or mold the mixture while melting and hence an unfoamed mold having a desired shape necessary for preparing fine and uniform foam structure can be easily obtained.

Furthermore, since in the process of this invention, the cross-linking promotor greatly promotes the cross-linking of polypropylene by high energy radiations, the cross-linking reaction necessary for obtaining a foam can be accomplished utilizing an extremely low dose of radiations. Moreover, the foam thus prepared has a fine and uniform cellular structure and has a high stability and good mechanical properties.

Further, according to the process of this invention, a continuous sheet-shaped foam of polypropylene having (1) closed cell percentage of more than 50 percent, i.e., an excellent heat insulating property or shock absorbing property, (2) a uniform cell structure of 10–500 microns in average cell diameter as well as excellent mechanical properties such as compressive hardness and bending strength together with a beautiful appearance, and (3) a density of 0.5–0.010 g./cm.$^3$, i.e., a continuous sheet-like foam having fine cellular structure and a high foaming percentage, unobtainable by conventional processes can be obtained.

The foams prepared by the process of this invention may be used as heat-insulating materials such as pipe covers, for hot water or steam, and walls for refrigerators; electric insulating materials requiring solvent resistance and heat resistance; shock absorbing packing materials for transporting televisions, transistor radios; heat liners for motor cars; and building materials and light-weight structural materials composed of combinations with other materials.

The inventors have, furthermore, found that by properly controlling the decomposition temperature of the foaming agent and the molding conditions, a foam having fine and uniform closed cell structure can be prepared very profitably. This is, according to the other embodiment of the process of this invention, a mixture of the polypropylene resin, the cross-linking promotor having at least two radical polymerizable double bonds and the chemical foaming agent of which the thermal decomposition rate $\Delta\theta (\Delta\theta = y/x$ wherein $x$ is heating period of time and $y$ is the amount of gas formed) $\leq 5$ (cc./g.min.) at 190°C. and $\geq 25$ (cc./g.min.) at 200°C. is molded into an unfoamed mold by means of a melt-knead molding machine under such conditions that the kneading period of time $(x')$ after the addition of the foaming agent satisfies $\Delta\theta x' \leq 15$ (cc./g.)at a resin temperature of 150°–190°C., irradiating the molded mixture with high energy radiations, and thereafter heating the mixture to a temperature higher than 200°C.

Figure 3:
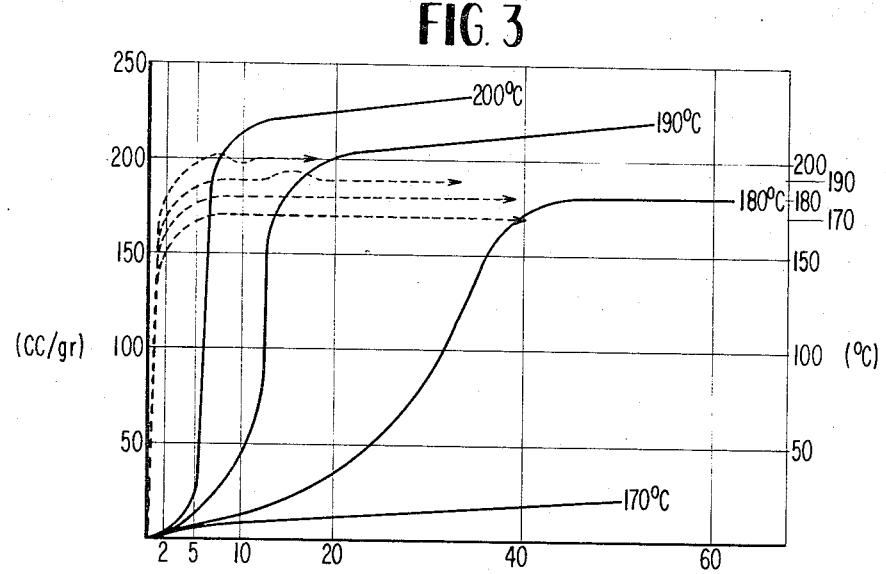
Figure 4:
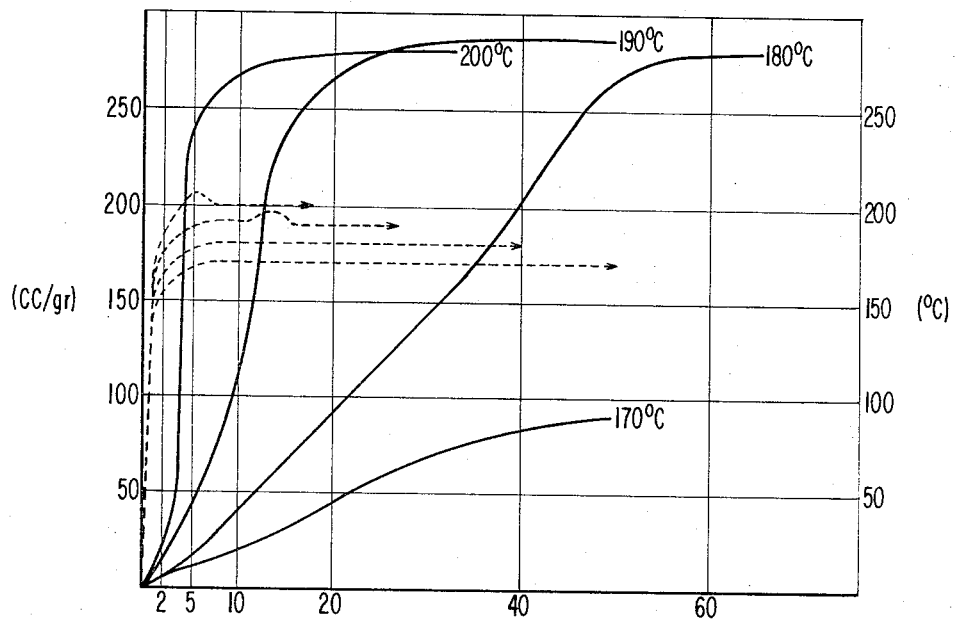

The foaming agent used is one having the aforesaid thermal developing rate. Suitable examples of the foaming agents are azodicarbone amide, dinitrosopentamethylene tetramine, trihydrazinotriazine, a metallic salt of azodicarboxylic acid, P-toluenesulfonyl semicarbazide, p,p'-oxybis(benzenesulfonyl semicarbazide), bisbenzenesulfonyl hydrazide, phenylazo isobutyronitrile, and the like. In FIG. 3 and FIG. 4 of the accompanying drawings, there are shown the thermal decomposition point curves of azodicarbone amide and dinitrosopentamethylene tetramine respectively at constant temperature, in which the solid line stand for the amount of the decomposed gas and the dotted line stands for the temperature of sample. These values were measured by dispersing 0.15 g. of the foaming agent in liquid paraffin in an amount 10 times of the liquid paraffin, placing the dispersion in a chamber equipped with a thermostat for maintaining the system at a constant temperature, cooling to room temperature the gas formed by the decomposition of the foaming agent in a definite time, and measuring the amount of gas by means of a gas burette.

If the decomposition temperature of the foaming agent is too low and the decomposition occurs too early, the foaming agent will be decomposed during molding of the resin to form gas and to cause foam, which results in uneven and large cells in the resin foam. On the other hand, if the decomposition rate of the foaming agent is too low even at a high temperature, it requires a long period of time to cause foaming, whereby the degradation of resin and collapse of cells occurs to provide an inferior foam.

The conditions for molding the unfoamed sheet of the polypropylene resin composition are mainly determined by the softening point of the polypropylene resin and the decomposition rate of the foaming agent to be employed. When the aforesaid foaming agent is employed, such conditions must be employed that the temperature of the resin extruded out of an extruding machine or at roll kneading is 150°–190°C. and also the average retention period of time $(x)$ after the addition of the foaming agent satisfies the conditions of $\Delta\theta \leq 5$ (cc./g.min.) and $\Delta\theta x \leq 15$ (cc./g.min.)at the resin temperature. If the temperature of the resin is higher than 190°C. or the resin composition is heated for a longer period of time than a definite one even at a temperature lower than 190°C. decomposition of the foaming agent and the thermal polymerization of the cross-linking promotor occur. Accordingly, uneven cells are formed in the resin. Also, the content of the cross-linking promotor is decreased to make the extent of cross-linking insufficient, which results in inferior foams having coarse and uneven cells.

According to the molding conditions of this invention as mentioned above, the resin is uniformly melted to provide the unfoamed sheet having uniformly dispersed therein the foaming agent and the cross-linking promotor by means of any molding procedure such as extrusion, injection molding, rolling, and pressing.

In the following table are shown the molding conditions and the states of gas formations in the unfoamed moldings, when a mixture of 100 parts by weight of polypropylene and 10 parts by weight of azodicarboxylic acid amide was molded under various conditions.

TABLE 2

| Molding | A | B | C | D | E |
|---|---|---|---|---|---|
| Extrusion molding | | | | | |
| | 170 | 0.5 | 10 | 5 | none observed |
| | 170 | 0.5 | 20 | 10 | " |
| | 180 | 1.5–2.0 | 6 | 9–12 | " |
| | 180 | 1.5–2.0 | 10 | 15–20 | slightly observed |
| | 190 | 5.0 | 3 | 15 | none |
| | 190 | 5.0 | 7 | 35 | observed |
| | 200 | 4.0 | 3 | 1120 | considerably |
| | 170 | 0.5 | 1.5 | 7.5 | none observed |
| | 180 | 1.5–2.0 | 6 | 9–12 | " |
| | 180 | 1.5–2.0 | 10 | 15–20 | slightly observed |
| Roll molding | 185 | 3.5 | 10 | 35 | observed |
| | 190 | 5.0 | 3 | 15 | none observed |
| | 190 | 5.0 | 6 | 30 | observed |
| | 200 | 4.0 | 2 | 80 | " |
| | 170 | 0.5 | 15 | 7.5 | none observed |
| | 180 | 1.5–2.0 | 5 | 7.5–14 | " |
| | 180 | 1.5–2.0 | 7.5 | 11–15 | " |
| Press molding | 190 | 5.0 | 3 | 15 | " |
| | 190 | 5.0 | 7 | 35 | observed |
| | 200 | 4.0 | 3 | 120 | considerably |

A: Resin temperature
B: (cc./g.min.)
C: Average heating time (min.)
D: (cc./g.)
E: Cell State The polypropylene resin may be mixed with the foaming agent and the cross-linking promotor by any known mixing manner under the conditions of temperature and the heating times shown above for the conditions for molding unfoamed moldings. In particular, there may be effectively employed a Henschel mixer, a Bumbury mixer, a mixing roll, an extruding machine, a press molding machine, a method wherein the polypropylene resin is immersed in a solution containing the foaming agent and the cross-linking agent. The aforesaid Henschel mixing or immersion mixing may be conducted at a temperature of room temperature to 130°C. and usually the mixing is conducted at about room temperature. The aforesaid embodiment of the present invention is very excellent since according to the process thereof the mixing and molding are conducted at a low temperature and in a short period of time by using a foaming agent having a very sharp decomposition time and hence the formation of undesirable side reactions can be prevented.

Now, the invention will be more fully explained by the following examples in which "isotactic degree" means the weight percent of undissolved portions when a polypropylene resin is dissolved in boiling n-heptane, "[$\eta$]" means an intrinsic viscosity in tetralin at 135°C., and "part" is "part by weight".

EXAMPLE 1

Figure 2:
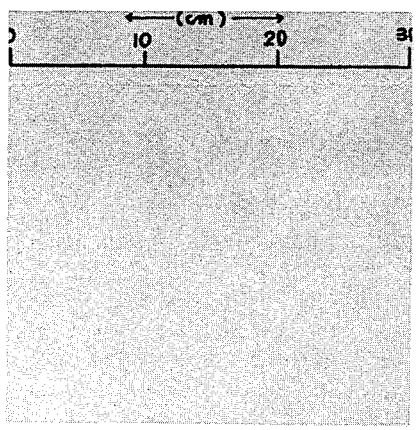

A mixture of 100 parts by weight of crystalline polypropylene having an isotactic degree of 95 and having an intrinsic viscosity [$\eta$] of 3.5, 10 parts of azodicarbone amide, and 3 parts of hydroquinonedimethacrylate was thoroughly kneaded by means of a mixing roll at 180°C. and molded into a sheet having a thickness of 2 mm. The opposite surfaces of the sheet were irradiated by electron rays from a van de Graaff accelerator at 4 megarads each and thereafter the sheet thus irradiated was foamed in a silicon oil at 220°C. to provide a white polypropylene foam having closed cells. The apparent density of the foam prepared was 0.035 g/cm$^3$, the average cell diameter was 250–300 microns and the cross-linking percentage of the foam (weight percent of undissolved portion when the foam was immersed in tetralin for 3 hours at 135°C.) was 70 percent. The photograph of the sliced surface of the foam is shown in FIG. 2 of the accompanying drawings.

EXAMPLE 2

A sheet-shaped composition prepared as in Example 1 was irradiated by means of a van de Graaff accelerator at the same dose. Thereafter, the sheet was placed in a metallic mold wherein the sheet was pressed by means of a press heated to 210°C. at a pressure of 100 kg./sq. cm. in gauge for three minutes. The pressure was then released suddenly to provide a white foam having fine closed cells. The apparent density of the foam was 0.04 g/cm$^3$ and the average cell diameter was 80–100 microns.

EXAMPLE 3

A mixture of 80 parts of crystalline polypropylene having an isotactic degree of higher than 95 and [$\eta$] of 2.4, 20 parts of Evaflex (trade name of a copolymer of ethylene and vinyl acetate sold by Mitui Poly Chemical Co.), 10 parts of azodicarbone amide, and 3 parts of hydroquinonediacrylate was thoroughly kneaded by means of a mixing roll at 180°C. and molded into a sheet of 3 mm. in thickness. The opposite surfaces of the sheet were irradiated with electron rays from a van de Graaff accelerator at 5 megarads each. The sheet was then foamed in a silicon bath at 220°C. to provide a white propylene foam having closed cell structure. The apparent density of the foam was 0.05 g/cm$^3$, the average cell diameter was 300–250 $\mu$, and the cross-linking percentage was 75 percent.

EXAMPLE 4

The same composition as in Example 3 was molded and cross-linked as in the same example and the sheet prepared was heated in a closed metallic mold under pressure to 210°C. to provide a foam having uniform cells of less than 50 microns in diameter.

EXAMPLE 5

A mixture of 1,000 parts of crystalline polypropylene having an isotactic degree of 95 and [$\eta$] of 3.0, 200 parts of p-toluenesulfonyl semicarbazide, and 50 parts of diallyl phthalate was kneaded by means of a Henschel mixer and molded into a sheet of 1.5 mm. in thickness by means of an extruding machine. The opposite surfaces of the sheet were irradiated with electron rays by means of an electron accelerator EBG (made by General Electric Co.) at 6 megarads each. The sheet was then foamed on salt bath heated to 220°C. to provide a continuous sheet-shaped foam having uniform cells. The apparent density of the foam was 0.04 g/cm³ and average cell diameter was 300–350 microns, and the cross-linking percentage was 68.5 percent.

EXAMPLE 6

A mixture of 80 parts of polypropylene having an isotactic degree of 96 and M.I. of 0.3, 20 parts of polybutadiene (sold under the trade name of "Nipol" by Nihon Zeon Co.), 15 parts of azodicarbone amide and 2 parts of hydroquinonediallyl ether was kneaded by means of a mixing roll, and molded into a sheet of 3 mm. in thickness. The surfaces of the sheet were irradiated by means of a van de Graaff accelerator at a dose of 4 megarads each to cause cross-linking. The sheet was then placed in a closed metallic mold and heated by means of a hot press of 210°C. to cause foaming, whereby a flexible or soft foam having very fine cells was obtained. The apparent density of the foam was 0.03, the average cell diameter was 50 microns, and the cross-linking percentage was 73.8 percent.

EXAMPLE 7

A mixture of 100 parts of polypropylene having an isotactic degree of 96 and $[\eta]$ of 3.0, 10 parts of azodicarbone amide, and 3 parts of bis-$\beta$-acryloyloxyethyl terephthalate was thoroughly kneaded by means of a mixing roll and molded into a sheet of 3 mm. in thickness. The opposite surfaces of the sheet were irradiated by means of a van de Graaff accelerator at 4 megarads each. The sheet was foamed in a silicon bath at 220°C. to provide a foam of polypropylene having an apparent density of 0.045 g/cm³ and an average cell diameter of 200–250 microns. The cross-linking percentage of the foam was 67.3 percent.

EXAMPLE 8

A mixture of 16,000 parts of crystalline polyropylene powders having an isotactic degree of 95 and $[\eta]$ of 2.4 4,000 parts of ethylene-vinyl acetate copolymer powders (vinyl acetate content 5 percent), 2,000 parts of azodicarbone amide, 600 parts of hydroquinonedimethacrylate, 1,000 parts of ethylvinyl benzene, and 60 parts of 2,6-di-tert-butyl-4-methyl phenol was dry-blended by means of a Henschel mixer and molded into a sheet of 400 mm. in width and 2.5 mm. in thickness by means of a 65 mm. extruder. The opposite surfaces of the sheet were irradiated with electron rays from a van de Graaff accelerator at 4 megarads each. The sheet was continuously foamed on by infrared rays heating on a salt bath heated to 230°C. to provide a white continuous sheet foam having a uniform cell of 200 microns in average cell diameter and having a thickness of 5 mm. The apparent density of the foam was 0.04 g/cm³ and the cross-linking percentage was 63 percent.

EXAMPLE 9

The irradiated sheet prepared by the same procedure as in Example 8 was cut into a sheet of 250 × 250 mm. and the sheet was heated and pressed in a metallic mold having the same inside volume by means of a press heated at 220°C. under a pressure of 200 kg./sq.cm. in gauge for 10 minutes to provide a polypropylene resin foam having a closed cell percentage of higher than 95 percent and average cell diameter of less than 100 microns. The apparent density of the foam was 0.043 g/cm³ and the cross-linking percentage was 65 percent. The Surface of the sliced article of the foam was very beautiful and the vacuum moldability thereof was very high.

EXAMPLE 10

A mixture of 100 parts of crystalline polypropylene powders having an isotactic degree of 96 percent and $[\eta]$ of 2.4, 30 parts of an ethylene-vinyl acetate copolymer (vinylacetate content 12 percent), 10 parts of azodicarbone amide, 0.3 part of 2,6-di-tert-butyl-4-methyl phenol, and 3 parts of the cross-linking agent shown in the following table was kneaded by means of a roll at 175°C. and molded into a sheet of 2 mm. in thickness. Then the sheet was irradiated with electron rays from a van de Graaff accelerator at 8 megarads and heated in a silicone bath at 230°C. to provide a foam having a uniform cellular structure, the results thereof are shown in the following table.

TABLE 3

| Cross linking agent | Cross linking (%) | Density (g/cc) | Average cell dia. ($\mu$) |
| --- | --- | --- | --- |
| p,p'-bis(methacryloyloxy)-phenyl ether | 67.5 | 0.034 | 200–250 |
| p,p'-bis(acryloyloxy)-benzophenone | 66.3 | 0.033 | 250–300 |
| 1,4-bis(methacryloyloxy)-cyclohexane | 68.4 | 0.034 | 150–200 |
| p,p'-bis(allyloxy)phenyl ether | 65.3 | 0.034 | 180–250 |
| Diallyl butenetricarboxylate | 64.5 | 0.034 | 250–300 |
| Triallyl trimellitate | 65.5 | 0.036 | 200–350 |
| Bis($\beta$-acryloyloxyethyl)-adipate | 68.3 | 0.033 | 200–250 |

EXAMPLE 11

A mixture of 80 parts of crystalline polypropylene having an isotactic degree of 95 and $[\eta]$ of 3.5, 20 parts of an ethylene-vinyl acetate copolymer (vinyl acetate content 18 percent), 10 parts of azodicarbone amide, 3 parts of hydroquinone dimethacrylate, and 0.2 part of 2,6-di-tert-butyl-4-methyl phenol was thoroughly kneaded by means of a mixing roll for 10 minutes at 175°C. and molded into a sheet of 2 mm. in thickness. The opposite surfaces of the sheet were irradiated with electron rays from a van de Graaff accelerator and the sheet was foamed in a silicon bath heated to 220°C. to provide a white propylene foam having fine closed cells. The apparent density of the foam thus obtained was 0.038 g/cm³ and the cross linking percentage thereof was 68.3 percent.

When the same composition as above was thoroughly kneaded for 10 minutes by means of a mixing roll, a part of the foaming agent was decomposed. The foam obtained by irradiating the sheet had such inferior cell structure that cells having cell diameter larger than 1,000 microns were scattered in cells of 200–350 microns.

What is claimed is:

1. A process for the preparation of a polypropylene resin foam which comprises mixing a polypropylene resin, said resin comprising more than 50 percent by weight stereospecific polypropylene, with a foaming agent and a cross-linking promoter selected from the group consisting of a polyacrylate of a polyhydric alcohol, a polymethacrylate of a polyhydric alcohol, a polyvinyl ether of a polyhydric alcohol, and a polyallyl ether of a polyhydric alcohol, a polyallyl ester of a polyhydric carboxylic acid, a polyvinyl ester of a polyhydric carboxylic acid, a polyacryloyloxyalkyl ester of a polyhydric carboxylic acid, and a polymethacryloyloxyalkyl ester of a polyhydric carboxylic acid; said polyhydric alcohol having five to 20 carbon atoms and having therein at least one member selected from the group consisting of an aliphatic ring and an aromatic ring; and said polyhydric carboxylic acid having more than five carbon atoms in the main carbon chain and less than 20 total carbon atoms, irradiating said mixture with high energy radiations whereby crosslinking is achieved, and thereafter heating the mixture to a temperature higher than the decomposition point of said foaming agent to cause foaming.

2. The process as claimed in claim 1 wherein, said polypropylene resin is stereospecific polypropylene.

3. The process as claimed in claim 1 wherein said polypropylene resin is a stereospecific copolymer of propylene comprising more than 50 percent by weight propylene units and

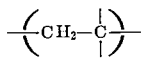

units.

4. The process as claimed in claim 1 wherein said polypropylene resin is a mixture of more than 50 percent by weight stereospecific polypropylene and organic high molecular weight material selected from the group consisting of poly-$\alpha$-olefin, a copolymer of an $\alpha$-olefin and a vinyl ester, a copolymer of an $\alpha$-olefin and $\alpha,\beta$-unsaturated carboxylic ester, a chlorinated poly-$\alpha$-olefin, and a synthetic rubber.

5. The process as claimed in claim 1 wherein said cross-linking promotor is a compound selected from the group consisting of a polyacrylate and polymethacrylate of a polyhydric alcohol having five to 20 carbon atoms and at least one aromatic ring, and a polyacryloyloxyalkyl ester and a polymethacryloyloxyalkyl ester of a polycarboxylic acid having more than 5 carbon atoms in the main chain and less than 20 carbon atoms.

6. The process as claimed in claim 1 wherein the average cell diameter of said polypropylene resin foam is 10–500 microns and the apparent density thereof is 0.5–0.01.

7. A process for the preparation of a continuous sheet-shaped polypropylene resin foam which comprises mixing a polypropylene resin with a foaming agent and a cross-linking promotor selected from the group consisting of a polyacrylate of a polyhydric alcohol, a polymethacrylate of a polyhydric alcohol, a polyvinyl ether of a polyhydric alcohol, and a polyallyl ether of a polyhydric alcohol a polyallyl ester of a polyhydric carboxylic acid, a polyvinyl ester of a polyhydric carboxylic acid, a polyacryloyloxyalkyl ester of a polyhydric carboxylic acid and a polymethacryloyloxyalkyl ester of a polyhydric carboxylic acid; said polyhydric alcohol having five to 20 carbon atoms and having therein at least one member selected from the group consisting of an aliphatic ring and an aromatic ring and said polyhydric carboxylic acid having more than five carbon atoms in the main chain and less than 20 total carbon atoms, molding the mixture into a continuous sheet, irradiating the sheet with high energy radiations whereby crosslinking is achieved, and thereafter heating the sheet to a temperature higher than the decomposition temperature of said foaming agent.

8. The process as claimed in claim 7 wherein said cross-linking promotor is a compound selected from the group consisting of a polyacrylate and a polymethacrylate of a polyhydric alcohol having five to 20 carbon atoms and at least one aromatic rings, and a polyacryloyloxyalkyl ester and a polymethacryloyloxyalkyl ester of a polyhydric carboxylic acid having more than 5 carbon atoms in the main chain and less than 20 carbon atoms.

9. The process as claimed in claim 7 wherein the average cell diameter of said polypropylene resin foam is 10–500 microns and the apparent density thereof is 0.5–0.01 g/cm³.

10. A process for the preparation of a polypropylene foam which comprises mixing a polypropylene resin with a cross-linking agent selected from the group consisting of a polyacrylate, polymethacrylate, a polyvinyl ether and a polyallyl ether of a polyhydric alcohol having five to 20 carbon atoms and having therein at least one member selected from the group consisting of an aliphatic ring and an aromatic ring, and a polyallyl ester, a polyvinyl ester, a polyacryloyloxyalkyl ester, and a polymethacryloxyalkyl ester of a polyhydric carboxylic acid having more than five carbon atoms in the main chain and less than 20 carbon atoms, and a foaming agent having a heat decomposition rate $\Delta \theta$ of 5 cc./g.min. or less than 5 cc./g.min. at 190°C and 25 cc./g. min. or larger than 25 cc./g.min. at 200°C., molding the mixture into an unfoamed molded mixture by means of a melt-knead molding machine under the conditions that the resin temperature is 150°–190°C. and the kneading period of time $(x')$ after the addition of the foaming agent satisfies $\Delta \theta x'$ being 15 cc./g. or less than 15 cc./g., irradiating the mixture with high energy radiations whereby cross-linking is achieved, and thereafter heating the mixture to a temperature higher than 200°C.

11. The process as claimed in claim 10 wherein said foaming agent is a compound selected from the group consisting of azodicarbone amide, dinitrosopentamethylene tetramine, trihydrozinotriazine, a metal salt of azodicarboxylic acid, p-toluenesulfonyl semicarbazide, p,p'-oxybis(benzenesulfonyl semicarbazide), bisbenzenesulfonyl hydrazide, and phenylazo isobutyronitrile.

12. The process as claimed in claim 10 wherein the average cell diameter of said polypropylene resin foam is 10–500 microns and the apparent density thereof is 0.5–0.01 g./cm³.

* * * * *